United States Patent [19]
Ciotola

[11] Patent Number: 4,927,181
[45] Date of Patent: May 22, 1990

[54] APPARATUS AND METHOD FOR SEALING LEAKS

[76] Inventor: Alfredo A. Ciotola, 1060 Revere Ave., Bronx, N.Y. 10465

[21] Appl. No.: 370,327

[22] Filed: Jun. 22, 1989

[51] Int. Cl.⁵ .............................................. F16L 55/16
[52] U.S. Cl. ...................................... 285/15; 285/294; 285/422; 138/99
[58] Field of Search ................. 285/15, 294, 297, 422; 138/99, 97

[56] References Cited

U.S. PATENT DOCUMENTS

| | | | |
|---|---|---|---|
| 866,395 | 9/1907 | Skinner et al. | 285/15 X |
| 1,045,376 | 11/1912 | Doellner | 138/99 |
| 2,776,153 | 1/1957 | Smith | 138/99 X |
| 3,152,816 | 10/1964 | Smith | 285/15 |
| 3,467,141 | 9/1969 | Smith | 138/97 |
| 3,603,616 | 9/1971 | Smith | 285/15 |
| 3,770,301 | 11/1973 | Adams | 285/15 |
| 4,049,296 | 9/1977 | Harrison | 285/15 |
| 4,057,082 | 11/1977 | King | 138/99 |
| 4,171,142 | 10/1979 | Harrison | 285/15 X |
| 4,240,650 | 12/1980 | Adams | 285/294 X |
| 4,274,640 | 6/1981 | Cook | 285/15 X |
| 4,406,481 | 9/1983 | Summerell | 285/15 |
| 4,568,091 | 2/1986 | Harrison | 285/15 |

*Primary Examiner*—Dave W. Arola
*Attorney, Agent, or Firm*—Mathews, Woodbridge & Collins

[57] ABSTRACT

The present invention is an apparatus and related method for sealing leaks at the surface of an article, comprising a plurality of interlocking links constructed to form a circumferential collar on the circumferential surface surrounding a leak. The links are constructed and arranged to exert radial pressure on the circumferential surface of the article. A sealing means is disposed between the circumferential surface of the article and the links.

33 Claims, 7 Drawing Sheets

APPARATUS AND METHOD FOR SEALING LEAKS

The present invention is an apparatus and related method for sealing leaks, more particularly it is directed to sealing leaking flange couplings.

BACKGROUND OF THE INVENTION

Flanges are projecting rims, collars or rings on articles such as, shafts, pipes, housings, valves, and the like. Flanges provide a place for attachment of such articles to each other. Such articles having adjacent cavities where the means to connect the article does not intrude into the cavity. Typically, there is fluid under pressure in the cavity. A sealing means, such as a gasket or O-ring is placed between the corresponding surfaces of flanges and the object to which it is connected, usually an opposing flange. Opposing articles are connected by means, such as nuts and bolts.

From time-to-time leaks develop in the gasket area of such connected articles. It is desirable to make such repair without having to disassemble the adjacent sections of the pipe or other connected articles. The ability to make such repairs enables the article to continue in use.

Apparatus and methods of making repairs to leaking pipe flanges have been disclosed in the art including U.S. Pat. Nos. 3,152,816; 3,467,141; 3,603,616; 3,770,301; 4,049,296; 4,171,142, and 4,274,640. While the apparatus disclosed provide satisfactory means to seal pipe flanges and other related leaks, as well as means to inject sealant between opposing flanges, they are limited in their use. Generally, these apparatus are limited to a specific circumferential shape of a given flange, i.e., circular, having a specific diameter.

SUMMARY OF THE INVENTION

The present invention is an apparatus and related method for sealing leaks, particularly between opposing flanges, which can vary with the shape or size of the circumference of the article to be sealed.

The present invention is an apparatus for sealing leaks at the surface of an article, comprising a plurality of interlocking links constructed to form a circumferential collar on the circumferential surface surrounding the leak. The links are constructed and arranged to exert radial pressure on the circumferential surface of the article. A sealing means is disposed between the circumferential surface of the article and the links.

The present invention includes an apparatus for sealing a leak located between a pair of opposing flanges having circumferential surfaces. The flanges are disposed in an abutting relation. The apparatus reduces and preferably eliminates leaks at the interface between the flanges. The apparatus comprises in combination a plurality of interlocking links constructed to form a circumferential collar on the circumferential surfaces surrounding the interface of said flanges. The links are constructed and arranged to exert radial pressure on the circumferential surface of the pair of flanges in a sealing relation to the interface between the flanges.

There is preferably a means for varying the radial pressure exerted on the circumferential surfaces of the links by adjusting the circumferential distance between the links. A gasket means can be interposed between said collar and the circumference surfaces of said flanges to form a seal between the collar and the interface of opposing flanges. There can be means for injecting sealing compound into the interface between said flanges.

The apparatus comprises a plurality of interconnected sealing links. Each sealing link comprises a pair of connecting surfaces with a sealing surface between the two connecting surfaces. At least one edge surface is between the two connecting surfaces. The sealing surface has a leak sealing means to form a seal around a leak and between the sealing surface and the article to be sealed. Preferably, the sealing surface has at least two preferably parallel slots extending between connecting surfaces. The connecting surface of each slotted sealing link is adjacent to a connecting surface of an adjacent link. The sealing surfaces of adjacent sealing links are aligned with parallel slots of adjacent links being aligned to form a continuous slot from link to link. A gasket means can be inserted in the parallel slots. The apparatus is located so that the leak is sealed between the gasket means and sealing surface.

There are a plurality of edge links wherein each edge link is attached to the edge surface of a slotted link and overlaps part of the edge surface of an adjacent link. The edge link can be separate from the sealing link or can be integrally attached. There is a connecting means communicating between each edge link and the overlapped part of the edge surface of each adjacent slotted link to connect each slotted link with an adjacent slotted link. The connecting means is preferably capable of forcing the slotted link and adjacent slotted link towards each other.

Preferably, the edge link has an overlapping surface which extends across part of the edge of the slotted sealing link and overlaps part of the edge surface of an adjacent slotted link. The edge link further comprises an opposite edge link surface, opposite to the overlapping surface. An edge link passageway, having a passageway axis, communicates between the opposite edge link surface and the overlapping surface. A tapered hole passes through the edge surface of the slotted link. The tapered hole is wider at the edge surface and narrows as it penetrates into the slotted link. The passageway axis of the edge link passageway is aligned with a tapered hole at the edge surface of the slotted link. A rod having a tapered rod end corresponding to the taper of the tapered hole is capable of being inserted and withdrawn from the edge link passageway. The rod is oriented so that the tapered rod end is directed toward the tapered hole. As the tapered rod is inserted into the tapered hole, the tapered hole forces adjacent links toward each other.

In a preferred embodiment of the present invention there is a means to inject a sealant between the parallel slots toward the interface between the flanges. Preferably, the means to inject sealant passes through the slotted surface between the two parallel slots.

In a preferred apparatus the sealing links are connected to form a closed loop. When the tapered rod is inserted so that only a portion of the taper point passes through the plane of the edge surface into the tapered hole, the adjacent slotted sealing links are loosely connected. As the rod is inserted further into the tapered hole, the adjacent slotted links are forced towards each other.

The closed loop can be placed around two connected flanges having corresponding adjacent circumferential surfaces. There is an interface between the two flanges, and a circumferential boundary at the intersection of the interface and the circumferential surfaces. The apparatus is located so that the slotted surface of each link is adjacent to the circumferential surfaces of the flanges with the interface boundary located between the two parallel slots of the slotted sealing links. As the rod is inserted into the tapered hole, the adjacent links are forced towards each other and the loop tightens about the circumferential surface. The gasket means located in the parallel slots tighten and seal against the surface of the flange to form a sealed cavity between the slotted surface, the two slotted link gasket means and the interface between the two flanges.

The apparatus of the present invention can form a closed loop the diameter of which can be varied by adding or removing links. The enclosed loop is preferably circular, although, the links can be in shapes to form other surfaces, such as ovals.

For general application the sealing surface of each link can be flat. However, the sealing surfaces can be contoured as desired to fit irregular or unusual shapes. The sealing surface can be contoured to have the radius of a circular or spherical article to be sealed. This feature is particularly useful to seal enclosures at high pressures, i.e., greater than 200 pounds per square inch; or enclosures under high vacuum.

The present invention can be used to seal leaks at enclosures where the pressure between the inside and outside of the enclosure is different. Typically, the apparatus of the present invention is useful to seal leaks from within the enclosure where the pressure inside the enclosure is higher than the pressure outside of the enclosure. The apparatus is also useful to seal leaks where the pressure outside of the enclosure is higher than the pressure inside of the enclosure, such as, where there is a vacuum inside the enclosure. The present invention can seal leaks of gas, liquids and solids (i.e. powders) and mixtures, such as slurries.

DETAILED DESCRIPTION OF THE PREFERRED EMBODIMENTS

The apparatus and method of the present invention will be understood by those skilled in the art by having reference to the accompanying figures. The present invention is an apparatus and related method for sealing leaks. In a preferred embodiment the present invention is useful for sealing leaks located at opposing flanges. Typically, such flanges are used to connect sections of pipe. There is a means to form a seal between opposing flanges which is usually a gasket. The present invention is particularly useful for sealing a leak at the interface between opposing flanges.

The interconnecting links form an enclosure about the circumferential surface formed by the two opposing flanges. Each link has a sealing surface. There is leak sealing means to form a seal around a leak and between the sealing surface and the article. Preferably, the links have a slotted sealing surface in which there are two slots which are preferably parallel slots. When the links are interconnected the parallel slots are aligned. A sealing means, such as an O-ring, is inserted into the slots. In a preferred embodiment spring-like shims are located between the slots and the sealing means to more uniformly force the sealing means against the circumferential flange surfaces. The connected slotted sealing links are positioned so that the interface between the two opposing flanges is located between the two aligned slots. The slotted sealing links are then tightened around the circumferential surface of the flange, and the O-rings are forced between the slots and the surface of the flange to form a seal. There is a suitable means to inject sealant passing into the enclosure formed by the plurality of interconnected slotted sealing links and the flanges. The means to inject sealant is preferably directed into the interface between the two opposing flanges. Preferably there are a plurality of such means to inject sealant located around the circumference of the flanges. Sealant is then passed through the means to inject sealant into the interface between the two opposing flanges. Because of the seal formed by the O-rings in the slotted sealing links, the sealant can be forced under pressure into the interface and sealed links. The apparatus preferably remains in place until the leak can be repaired. The apparatus can be removed leaving the sealant in place when the pressure of the sealant can withstand the pressure of the leak.

Figure 1:
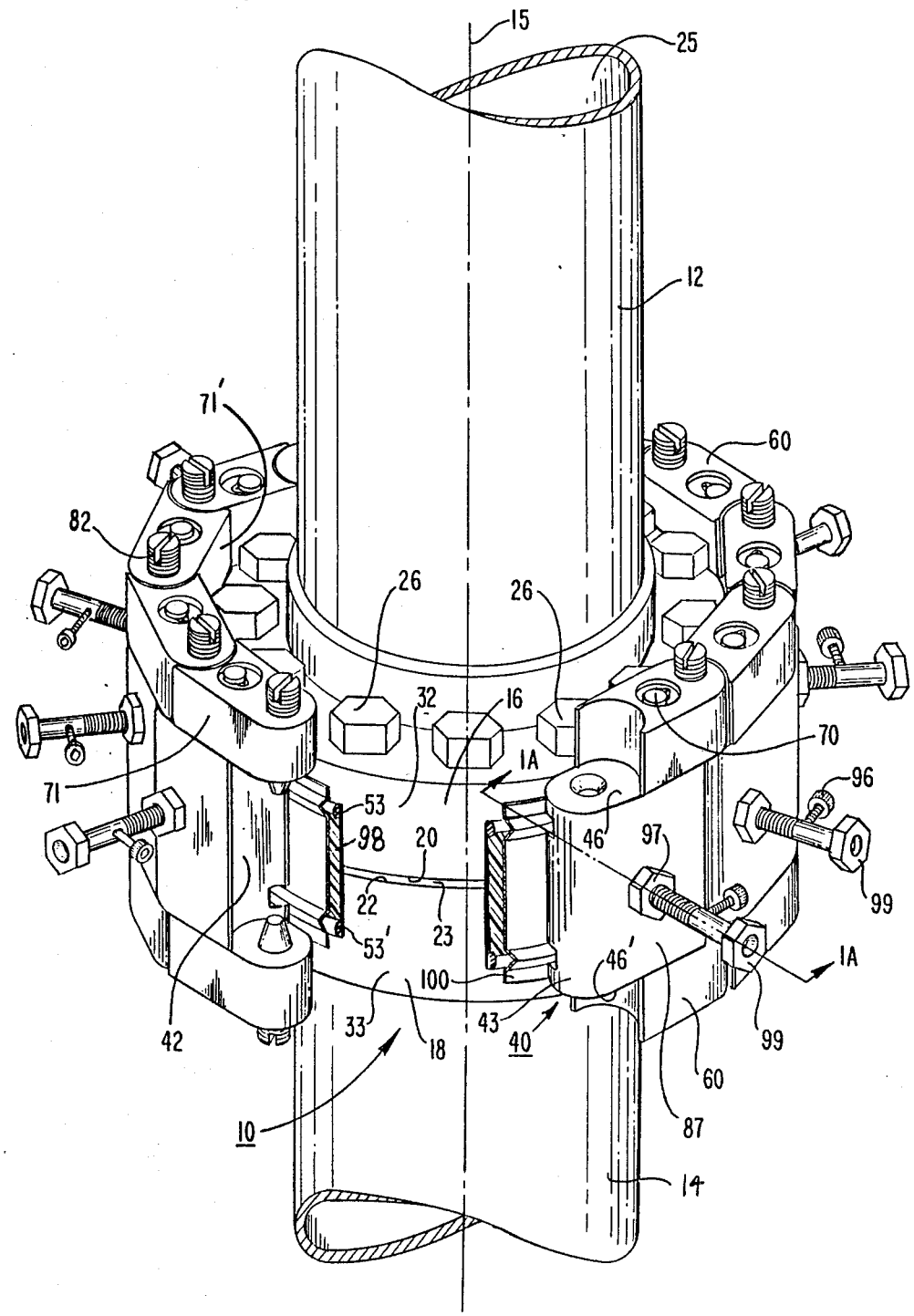
FIG. 1 is a perspective view of the apparatus partially assembled on a bolted pipe joint.

FIG. 1 is a view in perspective of the apparatus partially assembled on a bolted pipe joint.

The bolted pipe joint is generally identified as reference character 10. The pipe joint is located at the intersection of two pipe sections, pipe 12 and pipe 14. Pipes 12 and 14 are generally cylindrical pipes. The pipes are coaxial, having a common longitudinal axis 15. Each pipe has an end which is preferably in a plane perpendicular to pipe axis 15. Pipe flange 16 is attached to the end of pipe 12, and opposing flange 18 is attached to the end of pipe 14. Flanges 16 and 18 can be attached to the ends of pipes 12 and 14 by suitable means. Typically, the flanges are welded to the pipe ends. The flanges 16 and 18 have opposing, generally radial, flange surfaces 20 and 22, respectively. Preferably, the flange surface 20 and opposing flange surface 22 are flat and in a plane perpendicular to pipe axis 15. At least one of the flanges can optionally have a circumferential ridge, or other suitable shape, against which a gasket 24 can be placed. The flanges have circumferential surfaces 32 and 33.

The flange gasket 24 extends circumferentially around axis 15 of the opposing flanges. When the flanges are forced together a seal is formed at the flange gasket 24. The cavity 25 within pipe 12 and opposing pipe 14 is thereby sealed at the pipe joint by the pipe flange gasket 24. Suitable means can be used to force the flange and opposing flange together and maintain them in that position. In the assembly illustrated in FIGS. 1 and 1A, the two opposing flanges are secured in a sealing relationship with the gasket 24 therebetween by a plurality of flange bolts 26. There are a plurality of flange holes 28 axially passing through each flange. The flange holes in opposing flanges are located so that they can be axially aligned with the holes in the opposing flanges. Flange bolts 26 pass through holes 28 and opposing flanges and corresponding gasket holes 29 in gasket 24 and are secured by nuts 30. In this way pipe 12 and opposing pipe 14 are sealingly assembled at pipe joint 10. Interface 23 is between the two opposing flanges.

Figure 2A:
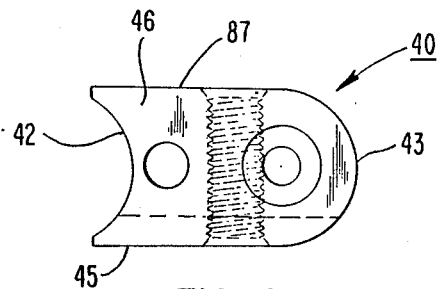
FIG. 2A is an elevational view of the edge surface of a slotted sealing link of FIG. 2.
Figure 2:
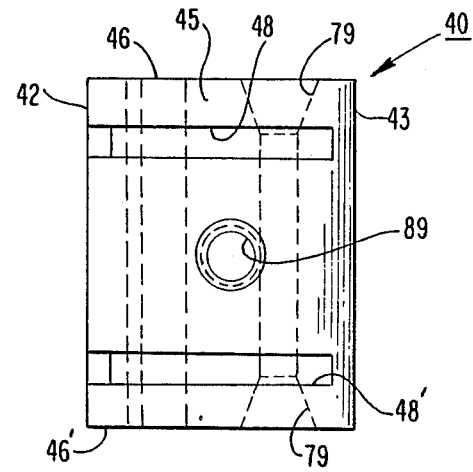
FIG. 2 is an elevational view of the slotted surface of a preferred slotted sealing link.

A preferred apparatus of the present invention is illustrated in FIGS. 1 through 7. The apparatus comprises a plurality of interconnected sealing links 40. The sealing links comprise a pair of opposing connecting surfaces shown in FIGS. 2 and 2A as reference characters 42 and 43. Connecting surface 42 and opposing connecting surface 43 can be flat or have corresponding shapes. In the embodiment illustrated FIGS. 1 through 7, 11 and 12, connecting surface 42 is concave and connecting surface 43 is convex. The surfaces 42 and 43 are generally parallel to the longitudinal axis of the article to be sealed, such as longitudinal axis 15 of pipes 12, 14. There is a sealing surface 45 between the connecting surface 42 and the opposing connecting surface 43. The sealing link 40 has at least one edge surface 46 located between the two connecting surfaces.

The sealing link 40 has a sealing means, such as, at least two, preferably, parallel slots 48 extending between connecting surfaces 42 and opposing connecting surface 43.

Figure 6:
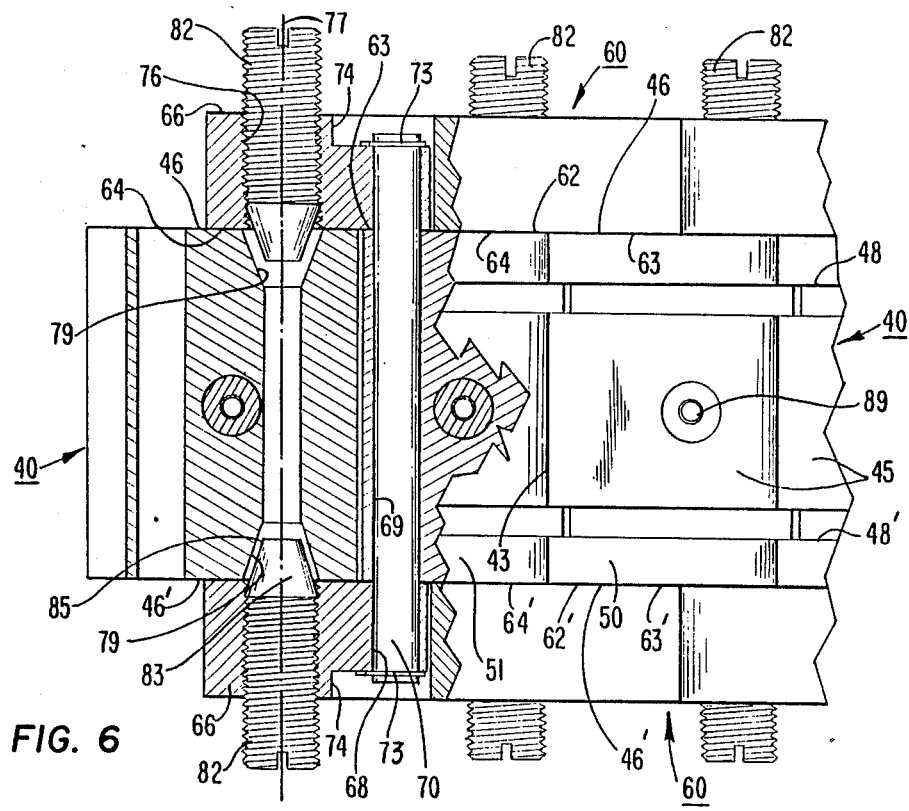
FIG. 6 is a partial, sectional elevational view in the direction of the slotted surface of the slotted sealing link as assembled without the shim.

The sealing links are interconnected so that each link is adjacent to an adjacent sealing link along the connecting surfaces. In FIG. 6, sealing link 50 is adjacent to adjacent sealing link 51. Connecting surface 42 of adjacent sealing link 51 is adjacent to connecting surface 43 of sealing link 50. When the sealing links are forced together along corresponding adjacent surfaces, there is a minimum of space between adjacent sealing links at the connecting surfaces. The slotted sealing surfaces 45 of adjacent sealing links are aligned so that they face in the same direction. In the embodiment shown in FIG. 1 all of the slotted surfaces face toward axis 15. The interconnecting sealing links are aligned so that each of the parallel slots of each sealing link are aligned with a corresponding parallel slot in adjacent sealing links. The plurality of interconnected sealing links thereby results in the slotted surface having two extended parallel slots. Where the plurality of sealing links form a continuous enclosure, the sealing links are aligned to form two enclosed continuous slots. In the embodiments shown in FIG. 1, and FIGS. 6 and 7, surface slots 48 and 48' of adjacent sealing links align to form continuous slots. The continuous slots form and define an enclosed circular slot. Preferably, a plane through each circular slot, 48 and 48', is perpendicular to the axis 15.

A sealing means, preferably a gasket means, such as O-rings 53 and 53', can be inserted into slots 48 and 48', respectively. The O-rings are located between the slotted sealing surface 45 and circumferential flange surfaces 32 and 33, respectively, to form a seal.

A feature of the present invention is a means to interconnect the sealing links around the surface to be sealed. There is a means to securely tighten in a sealing relation the O-rings about the circumference of the article to be sealed. This will sealingly enclose a an enclosure in which there is a leak. A useful and preferred means to accomplish this is by the use of a plurality of edge links 60, such as illustrated in FIGS. 1, 3, 6 and 7. Each edge link 60 is attached to the edge surface 46 of a sealing link 40. Each edge link overlaps part of the edge surface 46 of the sealing link 40 adjacent to the sealing link to which that particular edge link is attached. There is a means communicating between each edge link 60 and the overlapped part of the edge surface 46 of each adjacent sealing link 40 to connect each sealing link with the adjacent slotted sealing link. There is a means to force the sealing link and adjacent sealing links towards each other. Preferably, the means to connect the sealing link and to force the adjacent sealing links towards each other are the same.

In the preferred embodiment, there are a plurality of edge links. Preferably, there are edge links on opposite edge surfaces 46 and 46' of sealing links 40. The edge links 60 can vary in circumferential length and be on one or both edge surfaces 46 and 46'. For example, alternate edge links can be on opposite sealing link edge surfaces 46 and 46'. In the preferred embodiment, to obtain uniform pressure to force the interconnected slotted sealing links towards each other, the edge links have the same circumferential length as the sealing links, and are located on both edge surfaces 46 and 46'.

The edge links 60 can be separate elements from sealing links 40, with each edge link 60 having an adjacent surface 62. Adjacent edge link surfaces 62 and 62' are connected respectively to slotted edge link surfaces 46 and 46'. The edge link surface 62 is connected to a first sealing link, such as sealing link 50 in FIG. 6 at connected surface portion 63. A portion of the edge link surface 62 overlaps adjacent sealing link 40, such as adjacent sealing link 51 at overlapping surface portion 64. Each sealing link, i.e. 50, therefore is connected to a first edge link along the edge link surface 62 which overlaps onto the edge surface 64 of a second adjacent sealing link 51.

The edge links of FIGS. 1, 3, 6 and 7 have circumferential faces 71 and 71', and axial faces 72 and 72' nominally radial relative to axis 15. Axial faces 72 and 72' are preferably concave or convex to allow pivoting and movement relative to connecting rod 70 of FIG. 6 without interference with adjacent edge links which are aligned with convex face 72' of an edge link, adjacent concave face 72 of an adjacent edge link.

Each edge link 60 can be connected to a sealing link 40 at the interface between the edge surface 46 or 46' and the connected surface portion 63. The edge links can be attached by means which permit rotation of the edge link 60 relative to the sealing link 40 in a plane perpendicular to the sealing surface 45. In the embodiment illustrated in FIG. 6, edge link 60 has an edge link bore 68, and slotted sealing link 40 has a sealing link bore 69. The sealing link bore 69 aligns with the edge link bore. There is a connecting rod 70 passing through edge link bore 68 and sealing link bore 69. The connecting rod 70 is located so that the edge link and sealing link are adjacent to each other at the edge link surface 46 and the edge link connected surface portion 63. The rod can pass through opposite edge link counterbore 74 in the opposite edge link surface 66. The rod is secured in position by a suitable means, such as threaded nuts or clips 73, preferably at both ends, thereby securing the edge links to the sealing link.

In accordance with the present invention there is a means to force the interconnecting sealing links towards each other so as to decrease the circumference of the enclosure formed by the interconnected links and form a seal between the slotted sealing surface and the article to be sealed. A preferred means to force sealing links toward each other, as well as to interconnect them in such a way that they can be easily connected and disconnected, is illustrated in FIG. 6.

Each edge link 60 has an edge link passageway 76 communicating between the opposite edge link surface 66 and the overlapping surface portion 64. Each edge link passageway 76 has passageway axis 77. The sealing link edge surface 46 has a tapered hole 79 passing through the edge surface 46. The tapered hole 79 is wider at the edge surface and narrows as it penetrates into the sealing link. The passageway axis 77 is generally aligned with the axis of the tapered hole 79 when the interconnected sealing links are in a position where they are forced together. There is a rod 82 having a tapered end 83 with a tip 85. The taper at the tapered end 83 of the rod 82 corresponds to the taper of the tapered hole 79. The rod 82 is capable of being inserted and withdrawn from the edge link passageway 76. The rod is oriented so that the tapered rod end 83 is directed toward the tapered hole 79. Preferably, there is a means to secure the rod 82 in place along the passageway axis 77. The edge link passageway 76 and rod 82 are correspondingly threaded. The rod 82 is screwed into position at a desired distance. When the rod is completely tightened so that the tapered rod tip 85 is completely inserted into the tapered hole 79, the adjacent links are forced together.

The apparatus can be used to seal leaks. Preferably, there is a means to inject the sealant between the slots 48 and 48'.

Figure 1A:
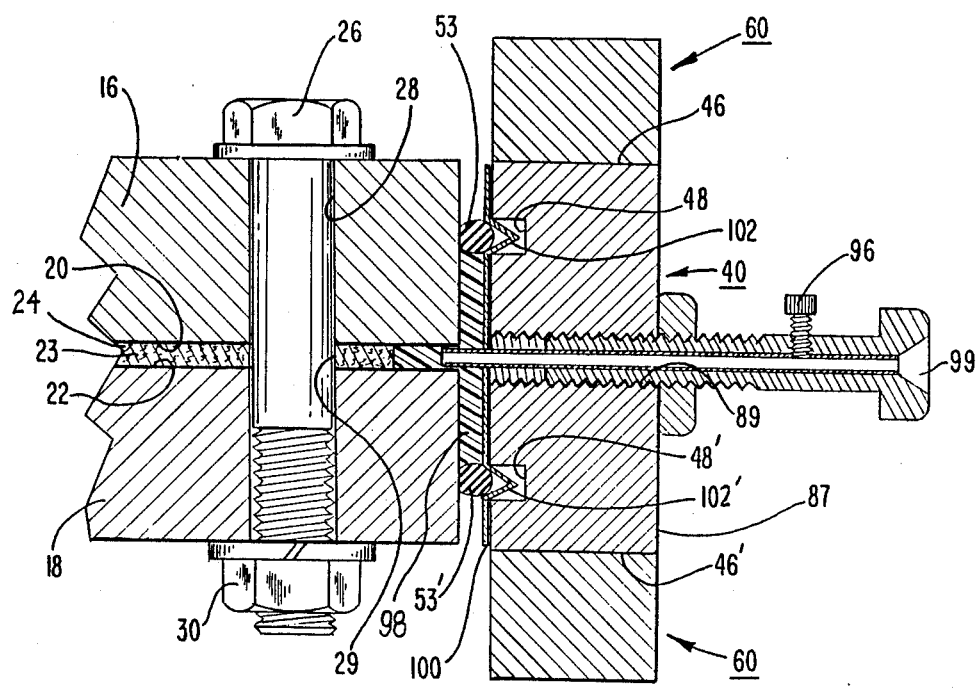
FIG. 1A is a fragmentary, cross-sectional view along the plane indicated by the line 1A—1A in FIG. 1.
Figure 4:
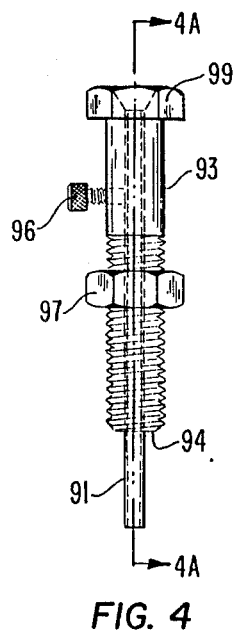
FIG. 4 is a side view of a means through which sealant is injected between the slots of the slotted sealing link.
Figure 4A:
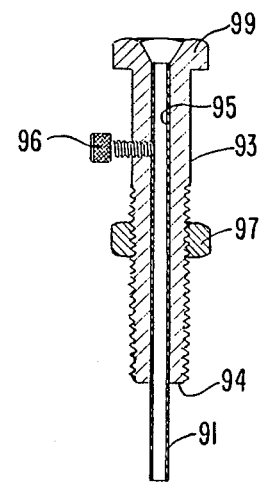
FIG. 4A is a sectional view along the plane indicated by the line 4A—4A in FIG. 4.
Figure 3A:
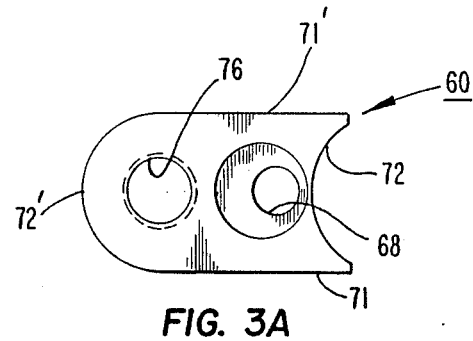
FIG. 3A is a top-elevational view of the opposite edge link surface of the edge link of FIG. 3.
Figure 3:
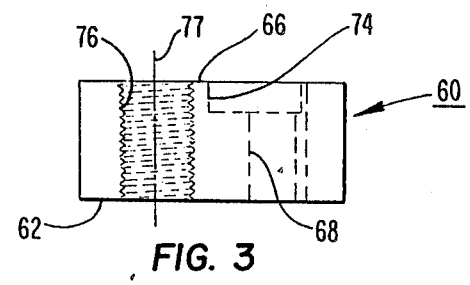
FIG. 3 is a side-elevational view of a preferred edge link.

The preferred means to inject sealant is illustrated in FIGS. 1A, 4 and 4A. The means is a passageway communicating through an opening in slotted sealing surface 45. The preferred means to seal comprises a seal passage 89 communicating from sealing link surface opposite 87 through the sealing link 40 and sealing surface 45, between slots 48 and 48'. There is a sealant tube 91 passing through seal passage 89. The sealant tube can be secured sealingly in place by any suitable means. A useful and preferred means is a threaded passageway illustrated in Figs. 1A, 3 and 4. A seal bolt 93 containing corresponding threads is threaded into the sealed passage 89. The seal bolt 93 is hollow having an axial seal bore 95. A seal tube 91 fits tightly into the seal bore 95. The seal bolt 93 is threaded into seal passage 89 but does not extend past sealing surface 45. The sealant tube 91 can extend past the seal bolt end 94. The sealant tube is secured and sealingly fitted into the sealed bore 95. The distance that the sealant tube extends past the slotted surface 45 can be controlled by the distance which sealed bolt 93 is threaded into sealed passage 89. There can be a suitable means, such as a lock nut 97, to secure the sealed bolt 93 in place. The seal bolt feed end 99 can be suitably designed to receive sealant from a source under pressure. The sealant tube 91 is secured in place in the seal bore 95 by a suitable means such as set screw 96 and/or by adhesive. In this way, sealant composition 98 can be fed through seal bolt feed end 99 through sealant tube 91 into the area to receive the sealant from sealed sealant tube 91. The sealed tube 91 is preferably aligned so that when the slotted links 40 are in position around the circumferential surfaces 32 and 33 of flanges 16 and 18, the sealant tube(s) 91 projects into flange interface 23.

Figure 7:
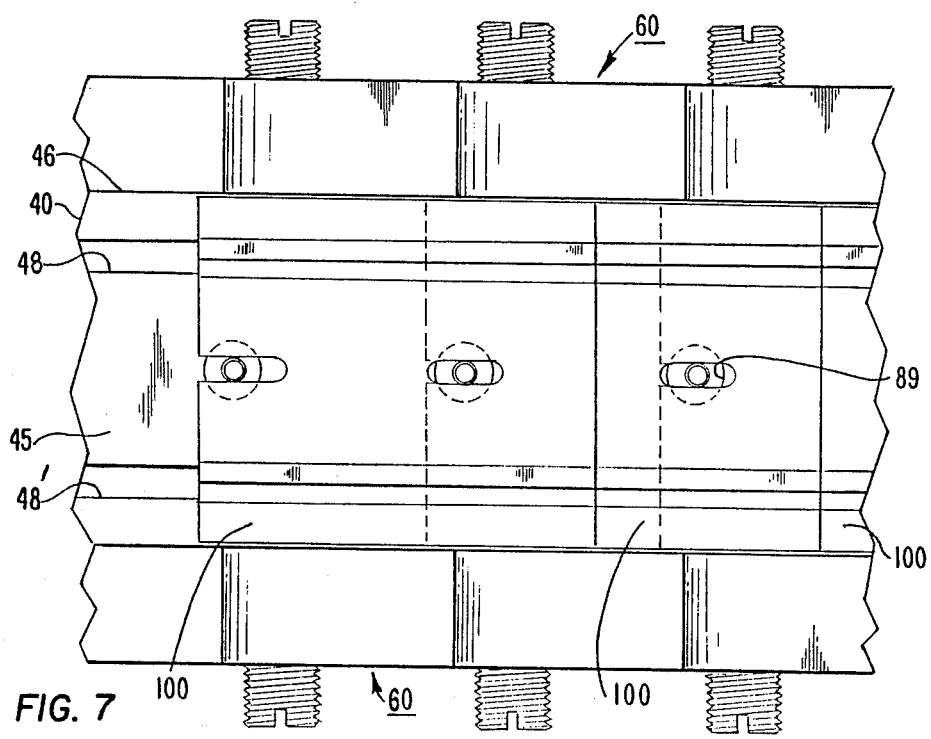
FIG. 7 is a partial, elevational view as assembled with the shims.

In an optional and preferred embodiment there are a plurality of shims 100 of the type illustrated in FIGS. 1, 1A, 5, 5A, 5B and 7. The shims are located between the sealing means, such as O-rings, and the slots 48 and 48' in sealing surface 45. The shims are thin spring-like sheets, preferably made of metal, that provide an additional and uniform force between the sealing link, sealing O-rings and flange surfaces 32 and 33. In a preferred embodiment the shim contains ridges 102 and 102' which fit into sealing surface slots 48 and 48', respectively. The opposite sides of the ridge form cross-sectional channels 104 and 104' into which the O-rings 53 and 53' are set. Preferably, the channel is a V-channel and the O-rings are circular in cross-section, as shown in FIG. 1A. In this way, the spring-like metal shim is compressed as the links 40 are forced together. This forces the O-rings against the flange surfaces. The shims 100 are preferably placed completely around the surface to be enclosed, as illustrated in FIG. 7. The shims can overlap so that the channels 104 and 104' align along slots 48 and 48'. There can be appropriately positioned sealant openings 106 in the shims through which sealant tube 91 can extend to the interface 23 between the flanges 16 and 18.

Figures 5, 5B:
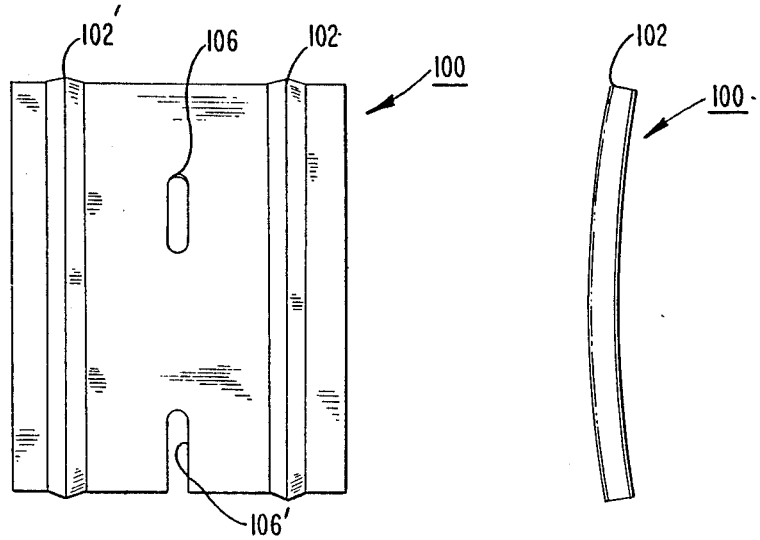
FIG. 5 is a top-elevational view of a shim used in the preferred embodiment of the present invention.
FIG. 5B is a side-elevational view of the shim of FIG. 5.
Figure 5A:
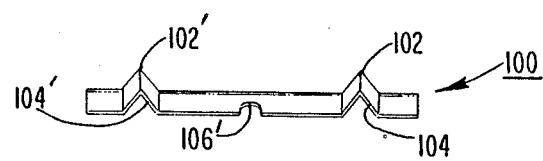
FIG. 5A is an elevational view of the edge of the shim of FIG. 5.

In the embodiment shown in FIG. 5 and FIG. 7, the shim is longer than the sealing link so as to assure that it extends across the space between adjacent slotted links. Accordingly, adjacent shims overlap. There is preferably more than one sealant opening 106 in each shim. In the particular embodiment in FIG. 5, one opening is located between the lateral edges of the shim, and one opening 106' is located at the edge.

Figure 9:
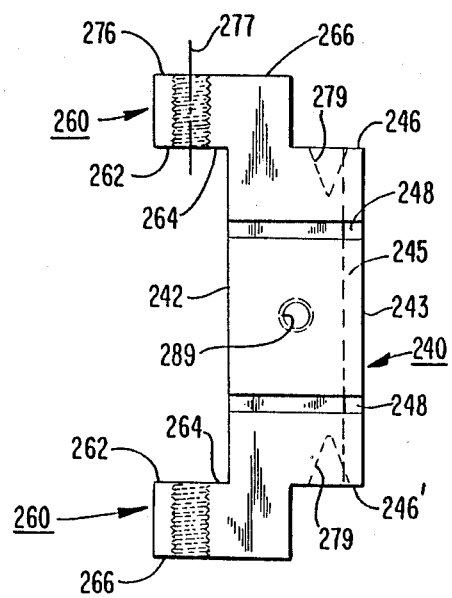
FIG. 9 is an elevational view of the slotted surface of the embodiment of FIG. 8.
Figure 10:
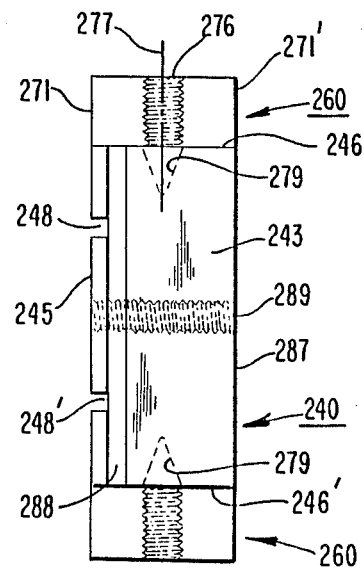
FIG. 10 is an elevational view of the slotted connecting surface of the embodiment of FIG. 8.
Figure 11:
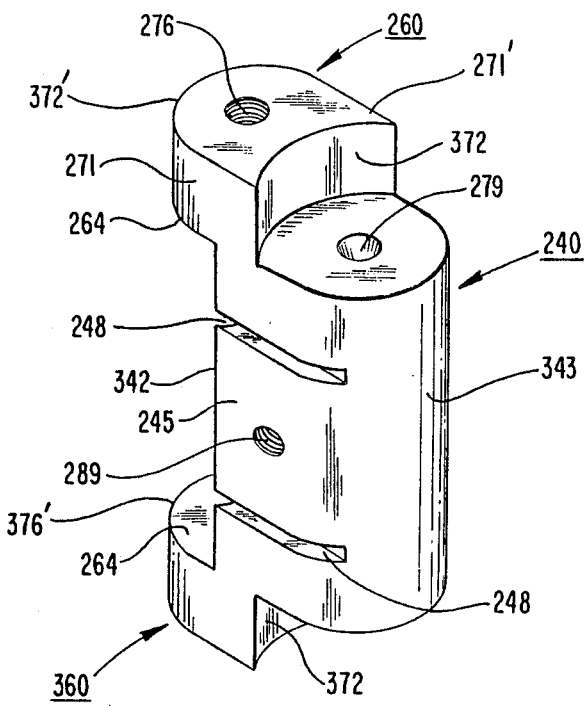
FIG. 11 is a view, in perspective, of a preferred embodiment of the present invention with the edge links integrally attached to the slotted sealing link, and the connecting surfaces curved.
Figure 12:
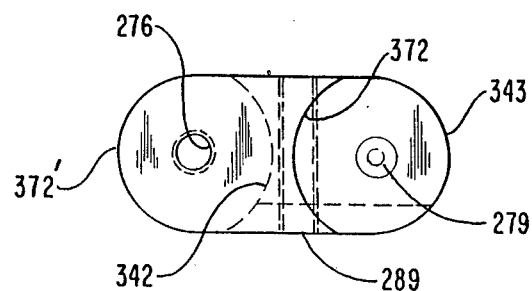
FIG. 12 is an end view of the embodiment of FIG. 11.

FIGS. 8 through 12 illustrate alternate embodiments of the present invention, wherein the sealing link and edge links are combined in one integral element. The embodiment of FIGS. 11 and 12 is the most preferred embodiment.

Figure 8:
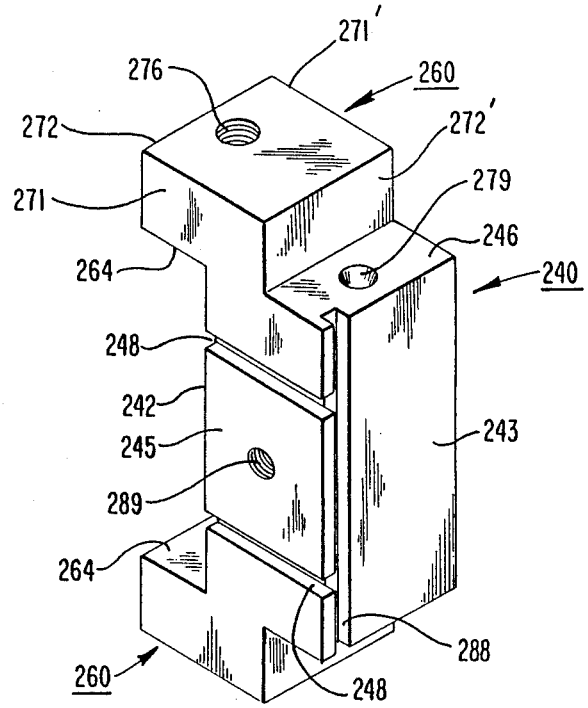
FIG. 8 is a view, in perspective, of an alternate embodiment of the present invention with the edge links integrally attached to the slotted sealing link.

In describing FIGS. 8 through 10, elements which are common to the sealing link illustrated in FIGS. 1 through 7, have been assigned the same reference character plus 200.

The integral link has a slotted sealing link portion 240 and an edge link portion 260. The slotted link portion 240 has corresponding elements and functions as the slotted sealing link 40; and the edge link portion 260 has corresponding function in elements to edge link 60.

The slotted link portion 240 can be a rectangular solid as illustrated in FIGS. 8–10 or have curved surfaces as illustrated in FIGS. 11 and 12. In the embodiment of FIGS. 8–10 the connecting surfaces 242 and 243 are flat and on opposite sides of the slotted link. The connecting surface 243 of a first link 240 is located adjacent to the connecting surface 242 of an adjacent second link 240. There is a sealing surface 245 between the connecting surfaces 242 and 243, and at least one edge surface, such as 246 or 246' at the edges of the link. Generally, the article to be sealed has an axis, such as pipe axis 15 of FIG. 1. The sealing surface is generally circumferential to the axis 15. The connecting surfaces are generally parallel to the axis, and the edge surfaces are generally perpendicular to the axis. The connecting surface 242 is between the overlapping surface portion 264 of edge links 260 and is slightly longer in the axial direction than the opposing connecting surface 243. The opposing connecting surface 242 of one link is adjacent to connecting surface 243 of the adjacent sealing link. The edge link portions have axial faces 272 and 272' and circumferential faces 271 and 271'.

The edge links 260 are integrally attached to the edge surfaces 246 and 246' of the sealing link portion 260. The edge link portion 260 has an overlapping surface portion 264 which is axially longer than the axial distance between opposite edge surfaces 246 and 246'. The slotted sealing link portion between surfaces 246 and 246' fits between the overlapping surface portions 264 of the adjacent edge link 260 and the connecting surface 242 and 243 of the adjacent sealing link are adjacent. Preferably, the length of the circumferential distance from axial face 272' to surface 243 is no greater than the circumferential distance of 264, and more preferably from 0.001 to 0.1 inches less.

The edge link 260 has an edge link passageway 276 which preferably has axis 277. The edge surfaces 246 and 246' have a tapered hole 279 generally coaxial with the axis of 277 of the passageway 276 when the edge links 260 are forced together. A plurality of sealing links are interconnected using a tapered rod analogous to that described with regard to reference character 82 of FIG. 6.

FIGS. 11 and 12 represent the most preferred embodiment of the present invention which is a combination of the integral link of FIGS. 8-10 with the curved connecting surfaces of FIGS. 1-7. The reference characters for common elements of FIGS. 8-10 and FIGS. 11-12 are the same and reference is made to the corresponding description. Corresponding elements of the embodiments of FIGS. 1-10 have the same reference characters plus 300, and reference is made to the corresponding descriptions. Connecting surfaces 342 and 343 correspond and are respectively concave and convex. Nominally axial faces 372 and 372' are respectively concave and convex. This embodiment is preferred since it can be mass produced by investment casting.

The embodiment illustrated in FIGS. 8 through 10 has an optional feature useful with the present invention. The embodiment contains an axial slot 288 in opposing connecting surface 243. Alternatively, the axial slot can be in surface 242. The axial slot 288 preferably intersects slotted surface slots 248 and 248'. A sealing means, such as an O-ring or gasket, can be inserted into axial slot 288. When there are a plurality of interconnected sealing links 240, the seal between the adjacent connecting surfaces 242 and 243 will be sealed at the sealing means in slot 288. The addition of sealing means in axial slot 288, coupled with sealing means in axial slots 248 and 248' permits the interconnecting slotted links to form a seal without the necessity of additional sealant or sealing means. A seal cavity is formed between the interface between the flanges and the network of sealing means in slots 248, 248' and 288.

Useful material to make the sealing links and edge links of the present invention include, but are not limited to, metal such as cold rolled steel, brass, aluminum alloys, and the like; polymeric materials including fiber/polymer composites.

Useful gaskets for the slots include, but are not limited to, elastomeric O-rings, wire reinforced elastomeric O-rings, and the like.

Useful sealants, such as epoxy resin or silicone resin based compositions, can be selected by one skilled in the art depending on temperatures, pressures and materials.

The present invention also includes a method of sealing leaks from between two flanges having adjacent surfaces and corresponding circumferential flange surfaces. The flanges are interconnected at adjacent surfaces with the circumferential surfaces in matched positions, as illustrated in FIG. 1 and described above. There is a flange interface 23 between adjacent flanges and a circumferential boundary at the intersection of the interface 23 and the circumferential flange surfaces 32 and 33.

The method comprises the steps of enclosing the circumferential boundary 31 in the above recited apparatus comprising a plurality of interconnected sealing links. Once enclosed, the method comprises forcing the adjacent sealing links toward each other until the interconnected sealing links sealingly force the gasket means against the circumferential flange surfaces. Preferably, the sealing links are slotted and have slot gasket means such as O-rings in the slots.

The method optionally includes a connecting surface or axial slot such as 288 in FIG. 8 where the slot is in at least one connecting surface such as surface 243. The connecting slot extends between two opposite edge surfaces. There is a connecting surface gasket means inserted in the connecting slot. The adjacent links are forced towards each other until the adjacent connecting surface gasket means and sealing means are forced against the connecting surface of the adjacent slotted link.

The slot gasket means preferably forms a seal which is air or liquid tight. However, the sealant seal need only be sufficient in order to permit a sealant to be forced into the flange interface 23 to seal the leak. Where no separate sealant is used the apparatus should be sufficient to seal the leak.

It will be understood that the scope of the invention is not limited by the specific form or dimensions of the embodiments disclosed herein, but only by the recitations of the appended claims.

What I claim is:

1. An apparatus for sealing leaks at a circumferential surface of an article, which apparatus comprises in combination:

a plurality of interlocking links constructed to form a circumferential collar on the circumferential surface surrounding the leak, the circumference of the collar can be varied by adding or removing links, each of said links having a sealing surface and constructed and arranged to exert radial pressure on the circumferential surface of the article; and a sealing means disposed between the circumferential surface of the article and the links to seal the leak.

2. The apparatus of claim 1 further comprising means for varying the radial pressure exerted on the circumferential surface by the links by adjusting the radial distance of said links from said surface.

3. The apparatus of claim 1 wherein the sealing means comprises gasket means interposed between said collar and the circumferential surface.

4. The apparatus of claim 3 further comprising a shim between the collar and the gasket means.

5. The apparatus of claim 1 which further comprises means for injecting sealant compound between the links and the circumferential surface.

6. The apparatus of claim 1 wherein the interlocking links comprise a flat sealing surface.

7. The apparatus of claim 1 wherein the leak is sealed between the circumferential surface, the links and the sealing means.

8. The apparatus of claim 1 wherein the sealing means is disposed between the circumferential surface and the sealing surface of each link.

9. The apparatus of claim 1 wherein radial pressure is varied by adjusting the circumferential distance between adjacent links.

10. An apparatus comprising:
a plurality of interconnected sealing links wherein each sealing link comprises:
at least two opposing connecting surfaces;
a sealing surface between the connecting surfaces, having means to receive a sealing means;
at least one edge surface between the two connecting surfaces;
each sealing link being adjacent to an adjacent sealing link along the connecting surface;
a plurality of edge links where each edge link is attached to the edge surface of a sealing link to connect each sealing link with one adjacent sealing link; and a means to force the adjacent sealing links towards each other.

11. The apparatus of claim 10 wherein the sealing surface of adjacent sealing links are aligned to circumferentially align the sealing means in adjacent sealing links;

12. The apparatus of claim 11 wherein the sealing surface is a slotted surface and the means to receive a sealing means is two slots.

13. The apparatus of claim 12 wherein the links are connected to form a closed loop.

14. The apparatus of claim 12 wherein the slots are parallel and there is a means to inject a sealant between the parallel slots.

15. The apparatus of claim 14 wherein the means to inject a sealant is located in the slotted surface between the two parallel slots.

16. The apparatus of claim 10 wherein each edge link overlaps part of the edge surface of an adjacent sealing link, there being a means communicating between each edge link and the overlapped part of the edge surface of each adjacent sealing link.

17. The apparatus of claim 16 wherein the edge link comprise an overlapping surface which is adjacent to and extends across part of the edge of the sealing link to overlap the point of the edge of the adjacent slotted link, and an opposite edge link surface, opposite the overlapping surface.

18. The apparatus of claim 17 wherein the edge link comprises an edge link passageway communicating between the opposite edge link surface and the overlapping surface, the edge link passageway having a passageway axis, and the sealing link has a tapered hole passing through the surface of the edge, the tapered hole being wider at the edge surface and narrowing as it penetrates into the sealing link; the passageway axis being aligned with the tapered hole when the interconnected sealing links are forced together, and the apparatus further comprising a rod having a tapered rod end, the taper corresponding to the taper of the tapered hole, the rod capable of being inserted and withdrawn from the edge link passageway and oriented so that the tapered rod end is directed toward the tapered hole.

19. The apparatus of claim 16 further comprising a means to secure the rod in place along the passageway axis.

20. The apparatus of claim 19 wherein the passageway is threaded and the rod has corresponding threads.

21. The apparatus of claim 10 wherein the edge links are integrally attached to the edge surface of the sealing links.

22. The apparatus of claim 4 further comprising a means to secure the rod in place along the passageway axis.

23. The apparatus of claim 21 wherein each edge link overlaps part of the edge surface of an adjacent sealing link, there being a means communicating between each edge link and the overlapped part of the edge surface of each adjacent sealing link.

24. The apparatus of claim 23 wherein the edge link comprises an overlapping surface which extends across part of the surface of the one sealing link to overlap part of the edge surface of the adjacent sealing link, and an opposite edge link surface, which is opposite the overlapping surface.

25. The apparatus of claim 24 wherein the edge link comprises an edge link passageway communicating between the opposite edge link surface and the overlapping surface, the edge link passageway having a passageway axis, and the sealing link has a tapered hole passing through the surface of the edge, the tapered hole being wider at the edge surface and narrowing as it penetrates into the sealing link; the passageway axis being aligned with the tapered hole when the interconnected sealing links are forced together, and the apparatus further comprising a rod having a tapered rod end, the taper corresponding to the taper of the tapered hole, the rod capable of being inserted and withdrawn from the edge link passageway and oriented so that the tapered rod end is directed toward the tapered hole.

26. The apparatus of claim 10 further comprising a plurality of shims located adjacent to the sealing surface.

27. The apparatus of claim 10 further comprising at least one connecting surface of each link having a connecting surface slot extending between two opposite edge surfaces, there being a gasket means inserted in the connecting surface slot.

28. The apparatus of claim 27 further comprises a plurality of shims located adjacent to the sealing surface, each shim having two parallel channels on one side and corresponding parallel ridges on the opposite side, the ridges are at least partially inserted in the slotted surface slots, the shims being between the slotted surface slots and the slot gasket means.

29. The apparatus of claim 10 wherein the interlocking links comprise a flat sealing surface.

30. A method of sealing a leak from between two flanges having adjacent surfaces and corresponding circumferential flange surfaces, the flanges interconnected at adjacent surfaces with the circumferential surfaces in matched position, there being an interface between the two flanges and a circumferential boundary at the intersection of the interface and the circumferential flange surfaces;
comprising the steps of:
forming a closed loop by interconnecting a plurality of sealing links each having a sealing surface, the circumference of the closed loop being varied by adding or removing links,
enclosing the circumferential boundary with the plurality of interconnected sealing links, there being a sealing means between the sealing links and each circumferential flange surface, asserting radial pressure on the sealing means by decreasing the distance between adjacent sealing links.

31. The method of claim 30 wherein the sealing links are slotted links which comprise a slotted sealing surface having a pair of parallel slots opposite the flange surfaces, there being sealing means at each slot where the adjacent slotted links are forced toward each other until the interconnected sealing links sealing force the parallel slot sealing means against the circumferential flange surfaces.

32. The method of claim 30 further comprising injecting sealant in a direction toward the enclosure formed between the circumferential surface of the flange, the surface of the sealing links, and the parallel slot gasket means.

33. The method of claim 31 further comprising injecting sealant through the sealing surface of at least one sealing link and into an interface between the adjacent flange surfaces.

* * * * *